United States Patent
Pan et al.

(10) Patent No.: US 8,189,648 B2
(45) Date of Patent: *May 29, 2012

(54) SCALING USING GAIN FACTORS FOR USE IN DATA DETECTION

(75) Inventors: Jung-Lin Pan, Smithtown, NY (US); Younglok Kim, Seoul (KR); Donald M. Grieco, Manhasset, NY (US)

(73) Assignee: InterDigital Technology Corporation, Wilmington, DE (US)

(*) Notice: Subject to any disclaimer, the term of this patent is extended or adjusted under 35 U.S.C. 154(b) by 337 days.

This patent is subject to a terminal disclaimer.

(21) Appl. No.: 12/549,912

(22) Filed: Aug. 28, 2009

(65) Prior Publication Data

US 2009/0316762 A1 Dec. 24, 2009

Related U.S. Application Data (63) Continuation of application No. 11/962,371, filed on Dec. 21, 2007, now Pat. No. 7,583,722, which is a continuation of application No. 11/408,411, filed on Apr. 21, 2006, now Pat. No. 7,313,172, which is a continuation of application No. 11/175,662, filed on Jul. 6, 2005, now Pat. No. 7,042,929, which is a continuation of application No. 10/327,299, filed on Dec. 20, 2002, now Pat. No. 6,928,104.

(60) Provisional application No. 60/396,823, filed on Jul. 18, 2002.

(51) Int. Cl.
*H04B 1/00* (2006.01)
*H04B 1/10* (2006.01)
*H04L 27/06* (2006.01)

(52) U.S. Cl. .......... 375/148; 375/340; 375/350
(58) Field of Classification Search ............ 375/144, 375/148, 152, 340, 350; 455/63.1
See application file for complete search history.

(56) References Cited

U.S. PATENT DOCUMENTS

| | | |
|---|---|---|
| 5,583,886 A | 12/1996 | Rohani et al. |
| 5,619,525 A | 4/1997 | Wiedeman et al. |
| 5,737,327 A | 4/1998 | Ling et al. |
| 5,991,636 A | 11/1999 | Won et al. |

(Continued)

FOREIGN PATENT DOCUMENTS

GB 2311702 10/1997

(Continued)

OTHER PUBLICATIONS

Third Generation Partnership Project, "Technical Specification Group Radio Access Network; Multiplexing and Channel Coding (FDD) (Release 4)", 3GPP TS 25.212 V4.0.0 (Dec. 2000).

(Continued)

*Primary Examiner* — Don N Vo
(74) *Attorney, Agent, or Firm* — Volpe and Koenig, P.C.

(57) ABSTRACT

Data is estimated from a received vector comprising a plurality of communications. A received wireless signal is converted to a baseband signal, which is sampled to produce a received vector. Channel responses are estimated for the received communications. The noise variance is estimated. The noise variance is scaled by a scaling factor. Samples are processed using the estimated channel responses and the scaled noise variance to produce a spread data vector. The spread data vector is despread to recover the data of the received wireless signal.

20 Claims, 3 Drawing Sheets

U.S. PATENT DOCUMENTS

| | | | |
|---|---|---|---|
| 6,085,104 | A | 7/2000 | Kowalski et al. |
| 6,151,358 | A | 11/2000 | Lee et al. |
| 6,175,588 | B1 | 1/2001 | Visotsky et al. |
| 6,356,639 | B1 | 3/2002 | Ishito et al. |
| 6,590,932 | B1 | 7/2003 | Hui et al. |
| 6,801,565 | B1 | 10/2004 | Bottomley et al. |
| 6,928,104 | B2 | 8/2005 | Pan et al. |
| 6,952,561 | B1 | 10/2005 | Kumar et al. |
| 2002/0057735 | A1 | 5/2002 | Piirainen |
| 2003/0099306 | A1* | 5/2003 | Nilsson et al. ............... 375/316 |
| 2003/0099309 | A1 | 5/2003 | Fimoff et al. |
| 2006/0121946 | A1* | 6/2006 | Walton et al. ............... 455/561 |
| 2010/0166100 | A1* | 7/2010 | Medvedev et al. ............ 375/267 |

FOREIGN PATENT DOCUMENTS

| | | |
|---|---|---|
| GB | 2362523 | 11/2001 |
| JP | H11-266232 | 9/1999 |
| JP | 2001-313588 | 11/2001 |
| KR | 10-0301284 | 6/2001 |
| WO | 01/82511 | 11/2001 |
| WO | 03/025513 | 3/2003 |

OTHER PUBLICATIONS

Third Generation Partnership Project, "Technical Specification Group Radio Access Network; Multiplexing and Channel Coding (FDD) (Release 5)", 3GPP TS 25.212 V5.2.0 (Sep. 2002).

Third Generation Partnership Project, "Technical Specification Group Radio Access Network; Multiplexing and Channel Coding (FDD) (Release 5)", 3GPP TS 25.212 V5.1.0 (Jun. 2002).

Third Generation Partnership Project, "Technical Specification Group Radio Access Network; Multiplexing and Channel Coding (FDD) (Release 4)", 3GPP TS 25.212 V4.6.0 (Sep. 2002).

Third Generation Partnership Project, "Technical Specification Group Radio Access Network; Multiplexing and Channel Coding (FDD) (Release 4)", 3GPP TS 25.212 V4.5.0 (Jun. 2002).

* cited by examiner

SCALING USING GAIN FACTORS FOR USE IN DATA DETECTION

CROSS REFERENCE TO RELATED APPLICATIONS

This application is a continuation of U.S. patent application Ser. No. 11/962,371, filed Dec. 21, 2007, which is a continuation of U.S. patent application Ser. No. 11/408,411, filed Apr. 21, 2006, which issued as U.S. Pat. No. 7,313,172 on Dec. 25, 2007, which is a continuation of U.S. patent application Ser. No. 11/175,662, filed Jul. 6, 2005, which issued as U.S. Pat. No. 7,042,929 on May 9, 2006, which is a continuation of U.S. patent application Ser. No. 10/327,299, filed Dec. 20, 2002, which issued as U.S. Pat. No. 6,928,104 on Aug. 9, 2005, which in turn claims priority from U.S. Provisional Application No. 60/396,823, filed Jul. 18, 2002, which are incorporated by reference as if fully set forth herein.

BACKGROUND

This invention generally relates to wireless code division multiple access (CDMA) communication systems. In particular, the invention relates to scaling using gain factors during data detection in such systems.

In wireless CDMA communication systems, multiple communications are transmitted over a shared spectrum. The individual communications are distinguished by a code used to transmit each communication. In frequency division duplex (FDD) CDMA systems, uplink and downlink communications are separated by frequency spectrum. In time division duplex (TDD) CDMA or time division synchronous code division multiple access (TD-SCDMA) systems, uplink and downlink communications are separated by time.

One approach to receive communications in such systems is referred to as single user detection (SUD). In general, SUD is typically performed in a two part process. First, the received signal is equalized to compensate for the response of the wireless channel. Second, the equalized signal is despread using the codes of the user or users. SUD is typically utilized when all communications experience a same channel response. The preferred uses for the SUD is in the downlink and in the uplink when a single user monopolizes a frequency spectrum (in FDD) or time slot (in TDD or TD-SCDMA). Another approach to receive communications in such systems is referred to as multi-user detection (MUD). In MUD, the data from all users' data is estimated simultaneously.

In such systems, the individual communications, transmitted simultaneously, may have varying transmission power levels. To illustrate, in the uplink, a single User Equipment (UE) may transmit multiple coded composite transport channels (CCTrCHs). Each CCTrCH may have a differing quality of service (QOS), requiring a different transmit power level to reach the required QOS. In the downlink, each UE in addition to each individual UE's CCTrCH may require a differing transmission power level.

Due to the varying power levels between communications, the orthogonality between the received codes is degraded, reducing the performance of the data detection. Accordingly, it is desirable to have alternate approaches to data detection.

SUMMARY

Data is estimated from a received vector comprising a plurality of communications. A received wireless signal is converted to a baseband signal, which is sampled to produce a received vector. Channel responses are estimated for the received communications. The noise variance is estimated. The noise variance is scaled by a scaling factor. Samples are processed using the estimated channel responses and the scaled noise variance to produce a spread data vector. The spread data vector is despread to recover the data of the received wireless signal.

DETAILED DESCRIPTION OF THE PREFERRED EMBODIMENTS

Figure 1A:
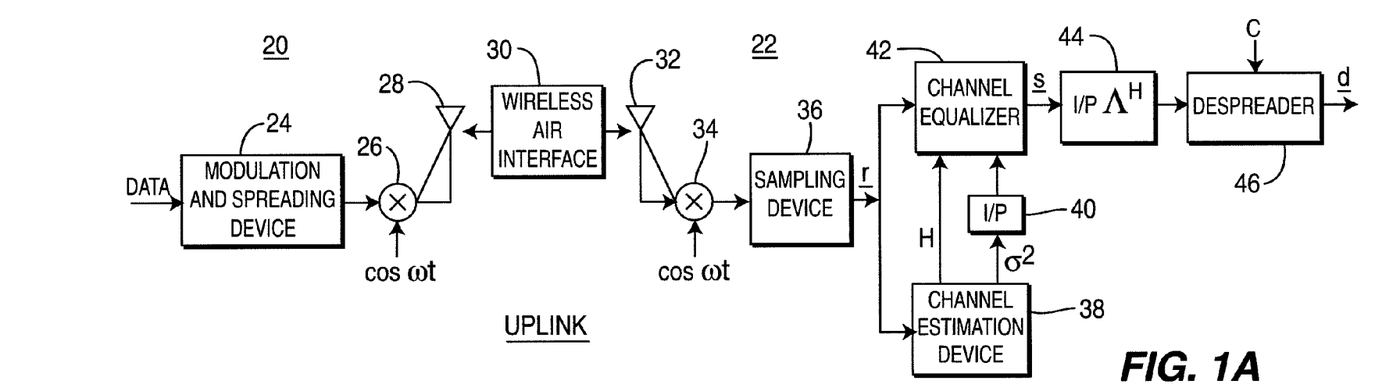
FIG. 1A is a simplified diagram of a transmitter and a receiver using gain factor scaling for the uplink.
Figure 1B:
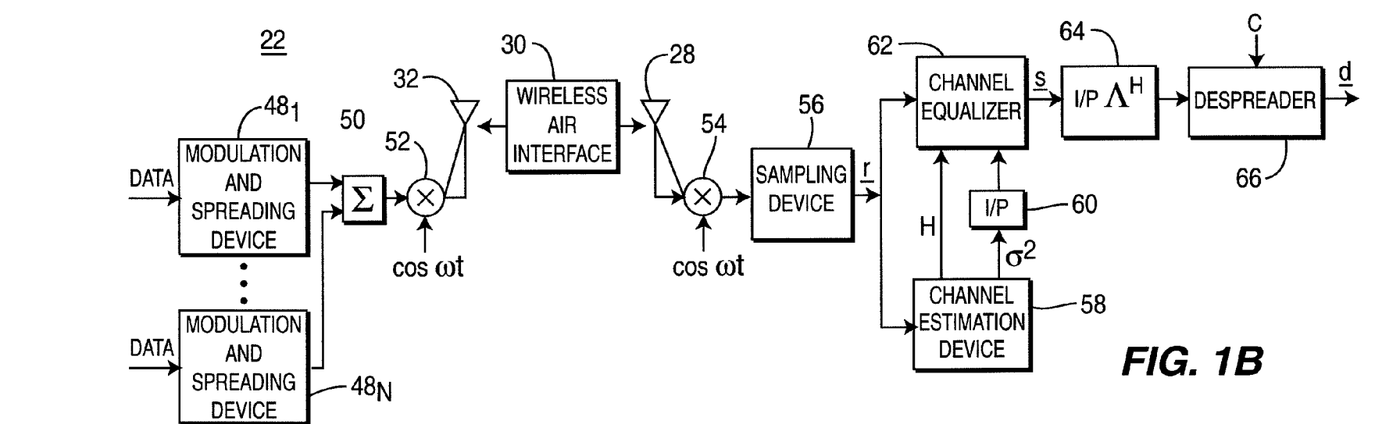
FIG. 1B is a simplified diagram of a transmitter and a receiver using gain factor scaling for the downlink.

FIGS. 1A, for the uplink, and 1B, for the downlink, are simplified diagrams of a transmitter and a receiver using gain factor scaling in a UE and base station. In FIG. 1A at the UE 20, data is spread by a modulation and spreading device 24 using the appropriate codes and modulated, such as by using quadrature phase shift keying (QPSK), M-ary quadrature amplitude modulation (QAM) or other modulation scheme. The spread signal is modulated to radio frequency by a modulation device 26 and radiated by an antenna 28 or antenna array.

Figure 1C:
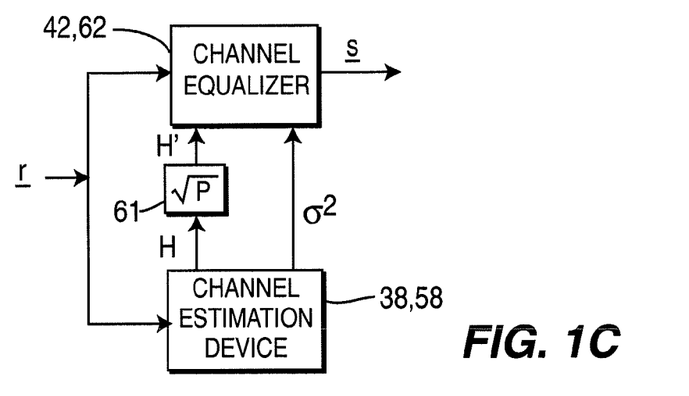
FIG. 1C is a simplified diagram of channel response matrix scaling.

After passing through the wireless air interface 30, an antenna 32 or antenna array at the base station 22 receives the communications. The received communications are converted to a baseband signal, such as by a demodulation device 34. A sampling device 36 samples the baseband signal, such as at the chip rate or a multiple of the chip rate, to produce a received vector r. A channel estimation device 38 estimates the channel responses for the received communications, as a channel response matrix H. All of the H matrixes in the following equations are presumed to be normalized. The channel estimation is typically performed using a reference signal, such as the midambles of communication bursts or a pilot code. The channel estimation device 38 also preferably estimates a variance of the noise $\sigma^2$, although the estimated noise variance may be derived from other sources. The noise variance $\sigma^2$ is scaled by a scaling device, such as by a factor of 1/P. Preferred derivations for the value of P are explained in detail later. Although the preferred embodiment scales the noise variance $\sigma^2$, the channel response matrix H may be scaled by a scaling device 61 instead of the noise variance, producing H', as shown in FIG. 1C. One approach to derive H' is to multiply H by the square root of P, $H'=H \cdot \sqrt{P}$. For such an H', $H'^H H'$ equals $PH^H H$.

A channel equalizer 42 uses the channel response matrix H and the scaled noise variance $\sigma^2/P$ to produce a spread data vector s. Preferably, the spread data vector s is scaled by a scaling device 64, such as by a factor $1/P \Lambda^H$, although this scaling device 64 may not be used. $(\cdot)^H$ is the conjugate transpose operation. When the scaling device 64 is not used, the spread data vector s is passed directly to the despreader 46. $\Lambda^H$ is a diagonal matrix, which preferred derivations are explained in detail later. The despreader 46 despreads the scaled spread data or spread data using the codes C of the communications to recover the data d.

In FIG. 1B at the base station 22, data is spread and modulated by multiple modulation and spreading devices $48_1$ to $48_N$ for transmission to one or multiple UEs 20. The spread signals are combined by a combiner 50 and modulated to radio frequency by a modulator 52. The modulated signal is radiated by an antenna 32 or antenna array.

At a UE 20, an antenna 28 or antenna array receives the communications sent through the wireless air interface 30. The received communications are demodulated by a demodulator 54 to baseband. A sampling device 56 samples the baseband signal to produce a received vector r. A channel estimation device 58 estimates the channel response matrix H and the noise variance $\sigma^2$. The noise variance is scaled by a scaling device 60, such as by a factor of 1/P. Alternately, as shown in FIG. 1C, the channel response matrix H can be scaled. A channel equalizer 62 processes the samples using the channel response matrix H and scaled noise variance to produce a spread data vector s. The spread data vector s is scaled by a scaling device 64, such as by a factor 1/P $\Lambda^H$, although scaling device 64 may not be used. When the scaling device 64 is not used, the spread data vector s is passed directly to the despreader 66. The despreader 66 despreads either the scaled or unscaled spread data using the codes C of that UE's communications to recover the data of the UE's communications. Typically, if some of the received communications are for other UEs 20, the codes of those communications are not used to despread the other UEs' data.

Discussion of preferred algorithms for scaling in data detection are explained in conjunction with a preferred wideband CDMA (WCDMA) TDD system, although the invention is applicable to other systems, such as FDD/WCDMA, TD-SCDMA, CDMA 2000 as well as others.

The received vector r can be modeled per Equation 1.

$$r = A\Lambda d + n \qquad \text{Equation 1}$$

A is the normalized symbol response matrix. $\Lambda$ is the signal amplitude gain matrix and is a diagonal matrix. n is the noise vector.

When K codes are transmitted at the same time (within the same timeslot), $A = [A_1, \ldots, A_K]$ is the normalized symbol response matrix of the K codes. $\Lambda$ is preferably of size $K \cdot N_s$. $N_s$ is the number of data symbols in a data field. $d = [d_1, \ldots, d_K]$ is the data sequence carried by the K codes. $\Lambda$ is per Equation 2.

$$\Lambda = \begin{bmatrix} \Lambda_1 & & & \\ & \Lambda_2 & & \\ & & \ddots & \\ & & & \Lambda_K \end{bmatrix} \qquad \text{Equation 2}$$

Each amplitude gain sub-matrix for a $k^{th}$ code of the K codes, $\Lambda_k$, is a diagonal matrix of size of $N_s$ with all the diagonals equal to the signal amplitudes, $g_k$, of the $k^{th}$ code, per Equation 3.

$$\Lambda_k = \begin{bmatrix} g_k & & & 0 \\ & g_k & & \\ & & \ddots & \\ 0 & & & g_k \end{bmatrix} \qquad \text{Equation 3}$$

To estimate data $\hat{d}$ in joint detection, a minimum mean square error (MMSE) approach per Equation 4 and 5 may be used.

$$\hat{d} = \Lambda^{-1}(A^H A + \Lambda^{-2}\sigma^2 I)^{-1} A^H r \qquad \text{Equation 4}$$

$$\hat{d} = \Lambda^{-1} A^H (AA^H + \Lambda^{-2}\sigma^2 I)^{-1} r \qquad \text{Equation 5}$$

$\hat{d}$ is the estimated data vector. Equation 4 and 5 are interchangeable by the matrix inversion lemma.

When all the communications pass through the same propagation channel H, the symbol response matrix A is per Equation 6.

$$A = [A_1, \ldots, A_K] = [HC_1, \ldots, HC_K] = H[C_1, \ldots, C_K] = HC \qquad \text{Equation 6}$$

H is preferably of size $Q \cdot N_s + W - 1$ by $Q \cdot N_s$. $N_s$ is the number of data symbols per data block that the data detection is performed. Q is the spreading factor of the communications and W is the length of the delay spread. C is preferably of size $Q \cdot N_s$ by $K \cdot N_s$.

The received signal for a common channel can be modeled per Equation 7.

$$r = HC\Lambda d + n \qquad \text{Equation 7}$$

Applying a MMSE solution to determine d is per Equation 8.

$$\hat{d} = \Lambda^H C^H H^H (HMH^H + \sigma^2 I)^{-1} r \qquad \text{Equation 8}$$

The matrix M is the code correlation matrix per Equation 9.

$$M = CGC^H \qquad \text{Equation 9}$$

M is preferably of size $Q \cdot N_s$. The matrix G is the code power matrix, per Equation 10.

$$G = \Lambda\Lambda^H = \begin{bmatrix} \Lambda_1^2 & & & \\ & \Lambda_2^2 & & \\ & & \ddots & \\ & & & \Lambda_K^2 \end{bmatrix} \qquad \text{Equation 10}$$

The code correlation matrix M is a diagonal dominant matrix with all the diagonals having a same value, such as P. One value for P is the total power of all bursts per Equation 11.

$$P = \sum_{k=1}^{K} g_k^2 \qquad \text{Equation 11}$$

In general, P is referred to as the code power scale factor. By ignoring the edge effects of the non-diagonal part of the matrix, an approximation for M, $\hat{M}$, is per Equation 12.

$$\hat{M} = P \cdot I \qquad \text{Equation 12}$$

By substituting Equation 12 into Equation 8, Equation 13 or 14 results.

$$\hat{\underline{d}} = \frac{1}{P} \Lambda^H C^H H^H \left(HH^H + \frac{\sigma^2}{P}I\right)^{-1} \underline{r} \quad \text{Equation 13}$$

$$\hat{\underline{d}} = \frac{1}{P} \Lambda^H C^H \left(H^H H + \frac{\sigma^2}{P}I\right)^{-1} H^H \underline{r} \quad \text{Equation 14}$$

Equation 13 and 14 are interchangeable by the matrix inversion lemma.

Equation 14 can be broken down in two stages per Equations 15 and 16.

$$\hat{\underline{s}} = \left(H^H H + \frac{\sigma^2}{P}I\right)^{-1} H^H \underline{r} \quad \text{Equation 15}$$

$$\hat{\underline{d}} = \frac{1}{P} \Lambda^H C^H \hat{\underline{s}} \quad \text{Equation 16}$$

In Equation 15, the channel equalization is performed. Preferably, the scaling in Equation 15 is performed by scaling devices 40, 60. Preferably, to reduce the complexity in solving equation 15 by the channel equalizer 42, 62, an approximate Cholesky or fast Fourier transform based solution is used, although other techniques may be used.

In Equation 16, the despreading is performed. The scaling, $$\frac{1}{P}\Lambda^H,$$

during or prior to despreading may or may not be performed. Such scaling tends to improve the decoding performance of turbo-encoded signals.

By careful selection of the code power scaling factor, the overall performance of the receiver can be improved. The performance of the receiver can be modeled by Equation 17.

$$\hat{s} = s + I_f + w \quad \text{Equation 17}$$

$I_f$ represents the residual interference after equalization due to the incomplete equalization of channel distortion that results in the inter-symbol interference (ISI) and multiple access interference (MAI). $\hat{s}_{est}$ of Equation 18 represents the impact of $I_f$ on the estimated spread data.

$$\hat{\underline{s}}_{est} = \underline{s} + I_f = \left(H^H H + \frac{\sigma^2}{P}I\right)^{-1} H^H H \underline{s} \quad \text{Equation 18}$$

w represents the noise after equalization and is per Equation 19.

$$\underline{w} = \left(H^H H + \frac{\sigma^2}{P}I\right)^{-1} H^H \underline{n} \quad \text{Equation 19}$$

The interference $I_f$ and noise w cannot be reduced simultaneously. Decreasing one tends to increase the other. For a large P, the residual interference is reduced, but the noise is increased. For a small P, the noise is reduced but at the cost of increased residual interference.

Two preferred embodiments for power scaling, determining P, are total power scaling and selective scaling. In total power scaling, P is determined per Equation 20.

$$P = P_T = K \cdot g_{avg}^2 = \sum_{m,n=1}^{M,N} K_{m,n} g_{m,n}^2 \quad \text{Equation 20}$$

M is the number of UEs and N is the number of CCTrCHs per UE. $K_{m,n}$ is the total number of codes in the $n^{th}$ CCTrCH of the $m^{th}$ UE and $g_{m,n}$ is the gain factor for the $n^{th}$ CCTrCH of the $m^{th}$ UE.

Total power scaling tends to optimize performance over all connections equally and not to optimize any connection over the others. To illustrate, the code power matrix G is per Equation 21.

$$G = \begin{bmatrix} \Lambda_{1,1}^2 & & & & & & \\ & \ddots & & & & & \\ & & \Lambda_{1,N}^2 & & & & \\ & & & \ddots & & & \\ & & & & \Lambda_{M,1}^2 & & \\ & & & & & \ddots & \\ & & & & & & \Lambda_{M,N}^2 \end{bmatrix} \quad \text{Equation 21}$$

$\Lambda_{m,n}^2$ is the code power sub-matrix corresponding to the $n^{th}$ CCTrCH of the $m^{th}$ UE. The code power $g_{m,n}^2$ in the matrix G and in G's sub-matrix can be approximated by one single common power in a least square error approach by minimizing Equation 22.

$$x_{lse} = \arg\min_x \sum_{m,n}^{M,N} (x - g_{m,n}^2)^2 \quad \text{Equation 22}$$

The solution of least-square-error-power is the average power of all codes per Equation 23.

$$g_{avg}^2 = \frac{1}{K} \sum_{m=1,n=1}^{M,N} K_{m,n} g_{m,n}^2 \quad \text{Equation 23}$$

K is the total number of codes transmitted in the time period of interest for the system and is per Equation 24.

$$K = \sum_{m=1,n=1}^{M,N} K_{m,n} \quad \text{Equation 24}$$

The code power scale factor is determined by Equation 25.

$$P = K \cdot g_{avg}^2 = \sum_{m,n=1}^{M,N} K_{m,n} g_{m,n}^2 \quad \text{Equation 25}$$

$g_{avg}^2$ is the average code power. A measure of the mismatch between code powers $\Delta_{m,n}$ is per Equation 26.

$$\Delta_{m,n}=|g_{m,n}^2-g_{avg}^2|$$ Equation 26

As illustrated, total power scaling is optimal over all connections by minimizing the code power mismatch over all connections.

In selective code power scaling, P is determined to optimize a particular UE connection. To optimize a $j^{th}$ UE's connection, Equation 27 is used.

$$P=\alpha_j P_T$$ Equation 27

$\alpha_j$ is a factor for the $j^{th}$ UE that is based on the interference and noise level. $\alpha_j$ should be adaptively adjusted based on the interference and noise level for optimum performance of the data detection. Two preferred equations for deriving $\alpha_j$ are per Equations 28 and 29.

$$\alpha_j = \frac{\frac{K}{K_j}\sum_{i=1}^{I}K_{i,j}g_{i,j}^2}{P_T} = \frac{K}{K_j}\sum_{i=1}^{I}\alpha_{i,j}$$ Equation 28

$$\alpha_j = \frac{\frac{1}{K_j}\sum_{i=1}^{I}K_{i,j}g_{i,j}^2}{P_T} = \frac{1}{K_j}\sum_{i=1}^{I}\alpha_{i,j}$$ Equation 29

$K_j$ is the total number of codes carried by that $j^{th}$ UE. $K_{i,j}$ is the number of codes for the $i^{th}$ CCTrCH of the $j^{th}$ UE. $g_{i,j}$ is the gain factor for the $i^{th}$ CCTrCH for the $j^{th}$ UE. I is the number of CCTrCHs of the UE.

Selective code power scaling may also be used to optimize a particular CCTrCH of a UE. To optimize the $i^{th}$ CCTrCH of the $j^{th}$ UE, Equation 30 is used.

$$P=\alpha_{i,j}P_T$$ Equation 30

$\alpha_{i,j}$ is a factor for the $i^{th}$ CCTrCH of the $j^{th}$ UE.

Selective code power scaling may also be used to optimize a particular code of a particular CCTrCH of a UE. To optimize the $n^{th}$ code of the $i^{th}$ CCTrCH of the $j^{th}$ UE, Equation 31 is used.

$$P=\alpha_{n,i,j}P_T$$ Equation 31

$\alpha_{n,i,j}$ is a factor for the $n^{th}$ code of the $i^{th}$ CCTrCH of the $j^{th}$ UE. Two preferred equations for determining $\alpha_{n,i,j}$ are Equations 32 and 33.

$$\alpha_{n,i,j} = \frac{Kg_{i,j}^2}{P_T}$$ Equation 32

$$\alpha_{n,i,j} = \frac{g_{i,j}^2}{P_T}$$ Equation 33

Two special cases of selective code power scaling are maximum code power and minimum code power scaling. In maximum code power scaling, the maximum code power is used for the scaling. Maximum code power scaling is most applicable when the over-scaling of code power degrades less than the under-scaling of code power. In minimum code power scaling, the minimum code power is used for scaling. Minimum code power scaling is most applicable when the under-scaling of code power degrades less than the over-scaling of code power.

Figure 2:
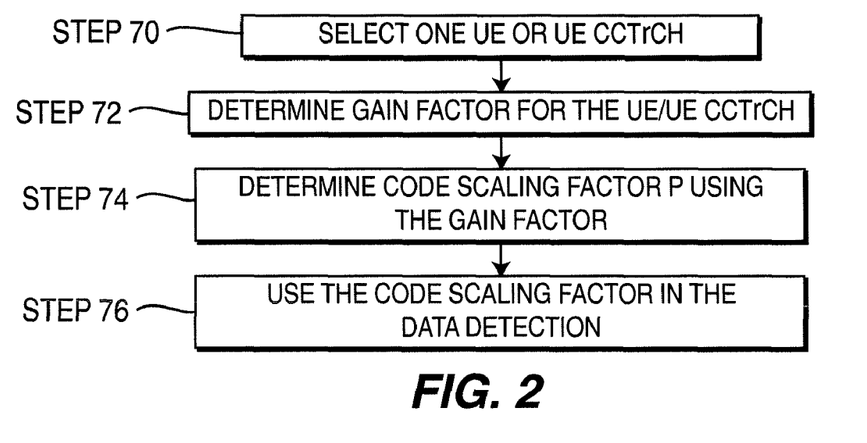
FIG. 2 is a flow chart for applying selective code power scaling.

FIG. 2 is one flow chart for applying code power scaling. One UE or UE's CCTrCH is selected for optimum performance, Step 70. If SUD is being performed at the UE the selected CCTrCH is typically with the highest required QOS. If SUD is being performed at the base station, the UE of interest may be the furthest UE, to reduce that UE's transmission power level. Alternatively, the UE or UE CCTrCH of interest may be the UE or UE CCTrCH requiring the highest quality of service. For the UE/UE CCTrCH of interest, the gain factor(s) for that UE/CCTrCH is determined, Step 72. The code scaling factor P is determined from the gain factor(s). SUD is performed using the determined P, Step 74. The code scaling factor P is used in the data detection, such as by scaling devices 40, 44, 60, 64, Step 76. As a result, that UE's/UE CCTrCH's performance is optimized.

Figure 3:
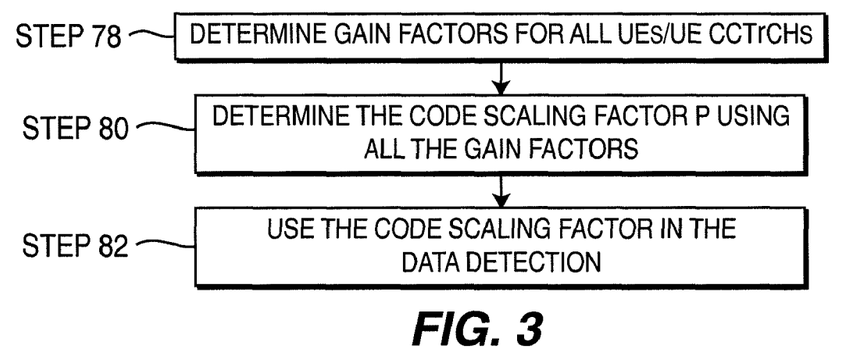
FIG. 3 is a flow chart for applying total power scaling.

FIG. 3 is a flow chart for total power scaling. Total power scaling is preferably performed if all the CCTrCHs at a UE or base station require the same QOS. Additionally, total power scaling may be applied to reduce the complexity by eliminating the need to optimize the SUD for a particular UE. The gain factors of all UE codes are determined, Step 78, and the resulting code scaling factor P is determined, Step 80. The SUD is performed using the determined P, Step 82. This approach equally optimizes all codes.

In some cases P is not necessarily determined from the gain factors. For instance, when a common midamble is used in a downlink allocation, the estimated channel response, H', has the total power information. Accordingly, the total power is embedded in the estimated channel response at the output of the channel estimator, i.e. $H'=H\cdot\sqrt{P}$. In this alternative, gain scaling is not required and steps 78 and 80 of FIG. 3 in this situation can be avoided.

Figure 4:
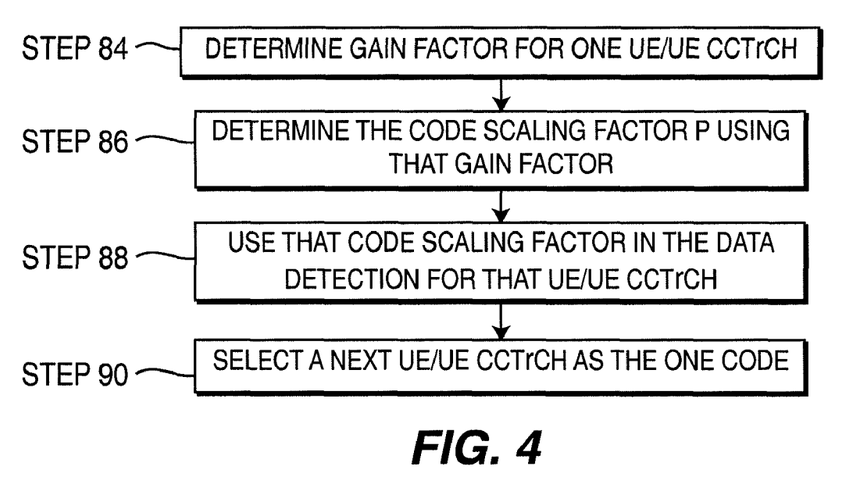
FIG. 4 is a flow chart for iterative selective code power scaling.

FIG. 4 is a flow chart of iterative selective code power scaling. To optimize the performances, each UE or UE CCTrCH can be optimized. Sequentially for each UE/UE CCTrCH, the gain factor(s) are determined and the resulting code scaling factor P is determined, Step 86. Using P, SUD is performed and the data for that UE/UE CCTrCH is estimated, Step 88. The process is repeated until each of the UEs/UE CCTrCHs have been processed or all the UEs/UE CCTrCHs of interest have been processed, Step 90. This approach optimizes overall performance for each UE/UE CCTrCH at the expense of added complexity and delay.

Figure 5A:
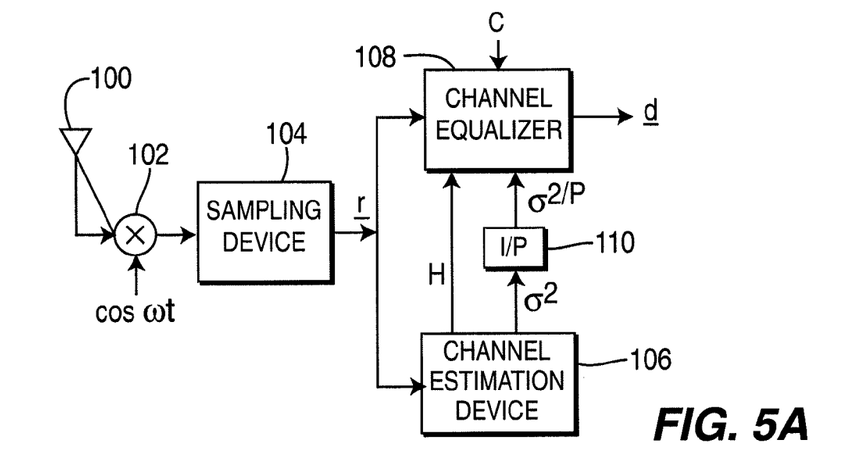
FIG. 5A is a simplified block diagram of a multiuser detection receiver using a scaled noise variance.
Figure 5B:
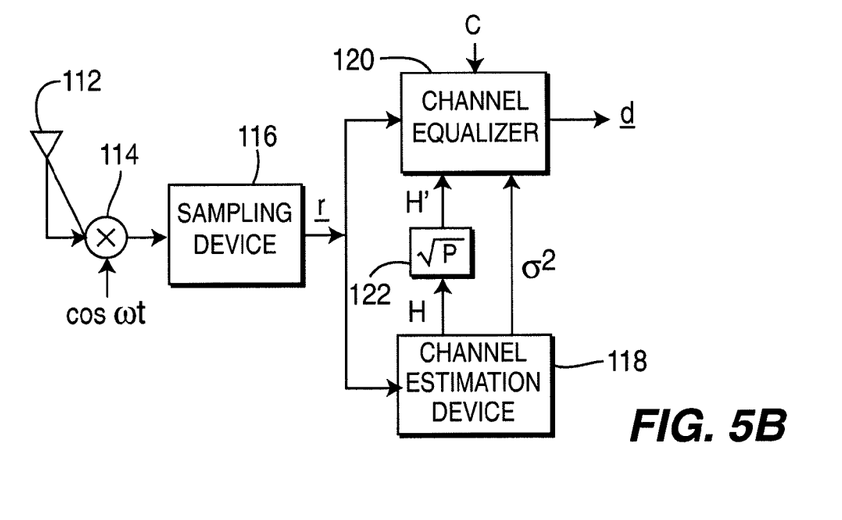
FIG. 5B is a simplified block diagram of a multiuser detection receiver using a scaled channel response matrix.

FIGS. 5A and 5B are simplified block diagrams of gain factor scaling used in a multiuser detection receiver. In multiuser detection, data from all codes is detected simultaneously. These approaches to data detection can also experience improved performance by using gain factor scaling.

In FIG. 5A, the received communications are received by an antenna 100 or antenna array. The received communications are demodulated to baseband by a demodulator 102. The baseband signal is sampled by a sampling device 104 to produce a received vector, r. A channel estimation device 106 estimates the channel response as a channel response matrix, H. The noise variance $\sigma^2$ is also determined, such as by the channel estimation device 106 or by another device. The noise variance $\sigma^2$ is scaled by a scaling device 110, such as by a value 1/P. The channel response matrix H and the noise variance $\sigma^2$ as well as the received vector and spreading codes C are input into a multiuser detection device 108. The multiuser detection device 108 produces a data vector d.

In an alternate approach as shown in FIG. 5B, the channel response matrix H is scaled. The received communications are received by an antenna 112 or antenna array. The received communications are demodulated to baseband by a demodulator 114. The baseband signal is sampled by a sampling device 116 to produce a received vector, r. A channel estimation device 118 estimates the channel response as a channel response matrix, H. The noise variance $\sigma^2$ is also determined, such as by the channel estimation device 118 or by another device. For some multiuser detection algorithms, the noise variance $\sigma^2$ is not used. For those algorithms, the noise variance $\sigma^2$ is not detected. The channel response matrix H is scaled by a scaling device 122, such as by a value $\sqrt{P}$. The channel response matrix H and the noise variance $\sigma^2$ as well as the received vector r and spreading codes C are input into a multiuser detection device 120. The multiuser detection device 120 produces a data vector d. Preferably, for use with multiuser detectors, P is derived using total power scaling.

Alternately, the gain factor scaling can be performed in conjunction with the multiuser detection. For such gain scaling, the multiuser detection device 108, 120 performs the gain factor scaling.

What is claimed is:

1. A method for recovering data from a plurality of communication signals transmitted in code division multiple access communication, the method comprising:
   receiving the communication signals;
   sampling the received communication signals to produce a received vector;
   estimating a channel response matrix and a noise variance based on the received vector;
   scaling the channel response matrix or the noise variance based on a code power scaling factor, wherein the code power scaling factor is based on a gain of at least one of the received communication signals;
   equalizing the received communication signals based on the scaled channel response matrix or noise variance to produce a spread data vector;
   despreading the spread data vector; and
   recovering data from the received communication signals based on the despread spread data vector.

2. The method of claim 1, further comprising:
   scaling the spread data vector;
   despreading the scaled data vector; and
   recovering data from the received communication signals based on the despread scaled data vector.

3. The method of claim 1, wherein the code power scaling factor is based on the gain of at least on selected communication signal.

4. The method of claim 1, wherein the code power scaling factor is based on the gains of all of the received communication signals.

5. The method of claim 1, wherein the code power scaling factor is based on the gain of a selected coded composite transport channel.

6. The method of claim 1, wherein the detecting data based on the despaired data vector utilizes a multiuser detection device.

7. A wireless spread spectrum user equipment comprising:
   an antenna for receiving a plurality of communication signals, the communication signals transmitted in a shared spectrum;
   a sampling device for producing a received vector;
   a channel estimation device for estimating a channel response matrix of the received communication signals;
   a scaling device for scaling the channel response matrix or a noise variance based on a code power scaling factor, wherein the code power scaling factor is based on the gain of at least one received communication signal;
   a channel equalizer for equalizing the channel response based on the received vector and the scaled channel response matrix or scaled noise variance and producing a spread data vector; and
   a data estimation device for recovering data from the received communication signals based on the spread data vector.

8. The user equipment of claim 7, wherein the data estimation device comprises a multiuser detection device.

9. The user equipment of claim 7, wherein the data estimation device comprises a despreader to despread the spread data vector.

10. The user equipment of claim 9, further comprising:
    a second scaling device for scaling the spread data vector, wherein the spread data vector is scaled by a scaling factor derived from at least one gain factor.

11. The user equipment of claim 7, wherein the at least one gain factor is a gain factor of a selected communication signal.

12. The user equipment of claim 7, wherein the scaling factor is derived from gain factors from all of the received communication signals.

13. The user equipment of claim 7, wherein the scaling factor is derived from gain factors from a selected coded composite transport channel.

14. A wireless spread spectrum base station comprising:
    an antenna for receiving a plurality of communication signals, the communication signals transmitted in a shared spectrum;
    a sampling device for producing a received vector;
    a channel estimation device for estimating a channel response matrix of the received communication signals;
    a scaling device for scaling the channel response matrix or a noise variance based on a code power scaling factor, wherein the code power scaling factor is based on the gain of at least one received communication signal;
    a channel equalizer for equalizing the channel response based on the received vector and the scaled channel response matrix or scaled noise variance and producing a spread data vector; and
    a data estimation device configured to recover data from the received communication signals based on the spread data vector.

15. The base station of claim 14, wherein the data estimation device comprises a multiuser detection device.

16. The base station of claim 14, wherein the data estimation device comprises a despreader to despread the spread data vector.

17. The base station of claim 16, further comprising:
    a second scaling device for scaling the spread data vector, wherein, the spread data vector is scaled by a scaling factor derived from at least one gain factor.

18. The base station of claim 14, wherein the at least one gain factor is a gain factor of a selected communication signal.

19. The base station of claim 14, wherein the scaling factor is derived from gain factors from all of the received communication signals.

20. The base station of claim 14, wherein the scaling factor is derived from gain factors from a selected coded composite transport channel.

* * * * *

UNITED STATES PATENT AND TRADEMARK OFFICE
CERTIFICATE OF CORRECTION

PATENT NO. : 8,189,648 B2
APPLICATION NO. : 12/549912
DATED : May 29, 2012
INVENTOR(S) : Pan et al.

It is certified that error appears in the above-identified patent and that said Letters Patent is hereby corrected as shown below:

IN THE CLAIMS

At Claim 3, column 9, line 42, after "of at least", delete "on" and insert --one--.

At Claim 6, column 9, line 51, after "on the", delete "despaired" and insert --despread--.

Signed and Sealed this
Nineteenth Day of March, 2013

Teresa Stanek Rea
*Acting Director of the United States Patent and Trademark Office*